May 27, 1969
R. E. McHARG
3,446,870
SEPARATION OF PYROLYSIS GASES
Filed Dec. 27, 1966
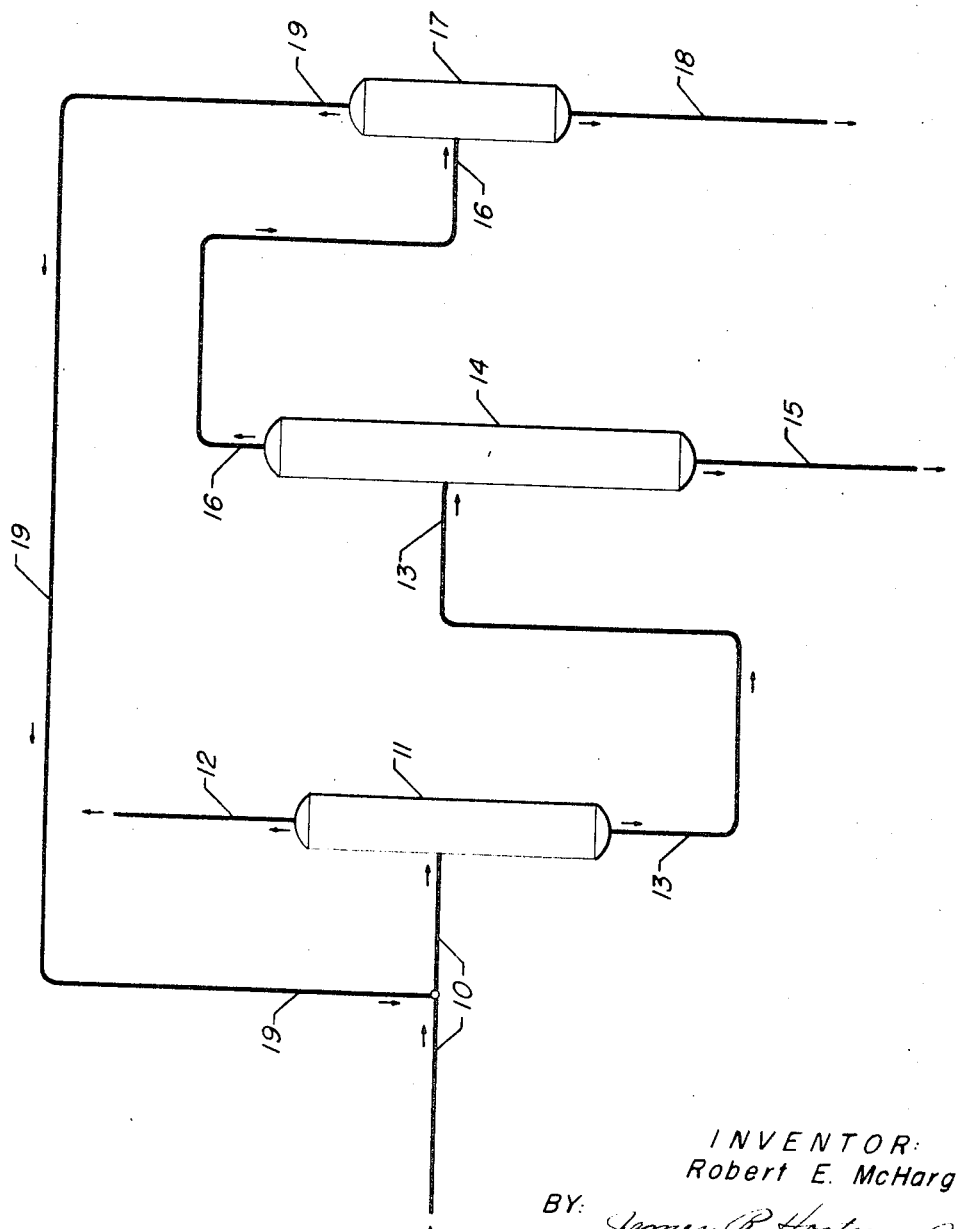
INVENTOR:
Robert E. McHarg
BY:
*James R. Hoolson, Jr.*
*Joseph C. Mason, Jr.*
ATTORNEYS United States Patent Office 3,446,870
Patented May 27, 1969

3,446,870
SEPARATION OF PYROLYSIS GASES
Robert E. McHarg, Arlington Heights, Ill., assignor to Universal Oil Product Company, Des Plaines, Ill., a corporation of Delaware
Filed Dec. 27, 1966, Ser. No. 606,423
Int. Cl. C07c 7/04, 11/16; B01d 3/14
U.S. Cl. 260—681.5                              6 Claims

ABSTRACT OF THE DISCLOSURE

A method for distilling the gaseous products from the thermal cracking of naphtha in a series of distillation columns whereby butadiene substantially free from $C_3H_4$ contaminants is recovered. The overhead product from the debutanizer column is subjected to further distillation at a pressure of 100 p.s.i.g. and a bottom temperature of 150° F. to produce an overhead product containing the $C_3H_4$ hydrocarbon contaminants and a bottoms product containing butadiene.

---

This invention relates to the separation of pyrolysis gases. It particularly relates to the separation of butadiene from such pyrolysis products. It specifically relates to a distillation method for recovering butadiene substantially free from $C_3H_4$ contaminants.

It is known in the art that one of the commercially attractive routes to the production of valuable light olefinic hydrocarbons is the thermal cracking for pyrolysis of hydrocarbons such as the light paraffin hydrocarbons and of light or heavy naphtha fractions. Usually the pyrolysis reaction is effected in the substantial absence of a catalyst at high temperatures often in the presence of superheated steam utilizing a tubular reactor or plurality of cracking furnace coils. Depending on the charge stock and specific operating conditions employed the pyrolysis zone effluent may comprise light olefinic hydrocarbons such as ethylene, propylene, butylene, etc., or mixtures thereof, any or all of which may constitute the principal product or products. It is also known that the pyrolysis zone effluent contains in addition to those mentioned hereinabove, butadiene in significant quantities so that in some cases it is highly desirable to recover the butadiene in high concentration for further use such as polymerization to rubber-like products. However, in the production of butadiene there are also produced other olefin hydrocarbon contaminants such as the $C_3H_4$ hydrocarbons illustrated by methyl-acetylene and propadiene.

Therefore, it is an object of this invention to provide a method for separating pyrolysis gases.

It is another object of this invention to provide a method for separating butadiene in high concentration from pyrolysis gases which also contain $C_3H_4$ hydrocarbons.

It is a specific object of this invention to provide a distillation method for separating pyrolysis gases into a butadiene product containing less than 500 p.p.m. of $C_3H_4$ hydrocarbons so that the butadiene may be further recovered in high purity by solely extraction methods.

According to the present invention there is provided a method for separating butadiene substantially free of $C_3H_4$ hydrocarbons from hydrocarbon pyrolysis gases comprising a major proportion of $C_1$ to $C_5$ hydrocarbons including butadiene and $C_3H_4$ hydrocarbons and a minor proportion of $C_5$ to 400° F. hydrocarbons which comprises: (a) introducing said pyrolysis gases into a first separation zone under conditions sufficient to produce a first fraction comprising $C_1$ to $C_3$ hydrocarbons including $C_3H_4$ hydrocarbons and a second fraction comprising $C_3+$ hydrocarbons contaminated with $C_3H_4$ hydrocarbons; (b) passing said second fraction into a second separation zone under conditions sufficient to produce a third fraction comprising $C_3$ and $C_4$ hydrocarbons including butadiene and said contaminant and a fourth fraction comprising $C_5+$ hydrocarbons; and (c) passing said third fraction into a third separation zone under distillation conditions including a temperature of less than 225° F. and a pressure of from 25 to 200 p.s.i.g. less than the pressure in said first separation zone sufficient to produce a $C_3$ fraction containing said contaminant and a $C_4$ fraction containing butadiene substantially free of contaminant.

A preferred embodiment of this invention includes the step wherein said $C_3$ fraction of step (c) is returned to the first separation zone of step (a).

A particular embodiment of this invention embodies operation conditions in said third separation zone which include a temperature from 125° F. to 200° F. in the bottom, from 50° F. to 100° F. in the top, and a pressure from 80 p.s.i.g. to 200 p.s.i.g.

An illustrative embodiment of this invention includes the step wherein the $C_4$ fraction substantially free from $C_3H_4$ hydrocarbons is passed into extractive distillation means under conditions to produce a bottoms product comprising solvent having butadiene dissolved therein and recovering butadiene in high concentration therefrom.

The production of pyrolysis gases to which this invention is distinctly applicable is by methods well known to those skilled in the art. For example, a typical operation involves the simultaneous cracking in separate parallel cracking zones of a normally gaseous paraffinic charge stock and a naphtha charge stock. The effluents from the two cracking or pyrolysis zones are combined and then charged to a prefractionation zone to effect a rough split between light and heavy ends and the prefractionator overhead material containing the pyrolysis products for further handling in accordance with this invention is passed through a fractionation train from which the several valuable olefinic products are recovered. Normally the naphtha cracking effluent contains a minor portion of light paraffins or $C_5$ to 400° F. range material which can be advantageously separated and recycled if desired to the paraffin cracking zone. Thus the prefractionator net overhead material comprises a major proportion of pyrolysis gases and a minor proportion of $C_5$ to 400° F. normally liquid material. The prefractionator overhead gas is typically a multicomponent mixture containing light nonhydrocarbons such as hydrogen, hydrogen sulfide, carbon monoxide, and carbon dioxide; hydrocarbon including methane, ethane, ethylene, acetylene, propane, propylene, butane, $C_4$ olefins, pentanes, etc.; and water vapor in approximately saturation quantity.

Preliminary to product recovery the prefractionator overhead gas is compressed to superatmospheric pressure and charged as feed to a first distillation zone, the overhead from which is rich in $C_3$ and lighter hydrocarbons and the bottoms product is rich in $C_4$ and heavier hydrocarbons. The feed composition is often such that the first distillation zone or more commonly known as depropanizer must be operated with refrigerated reflux to provide a commercially satisfactory operation. The $C_3-$ fraction is then separated in a series of low temperature fractionating columns while the $C_4+$ fraction is separated also in a series of fractionating columns. As is well known to those skilled in the art, water vapor must be removed from these pyrolysis gases such that hydrate formation can be avoided at the low temperature operations required for the recovery of the light olefinic hydrocarbons such as ethylene and propylene. Removal of water from such a gas stream is conventionally accomplished by passing the stream through a fixed bed of solid dessicants such as activated alumina, activated charcoal, or silica gel.

In the practice of this invention, the pyrolysis gas as received from the pyrolysis plant prefractionating column is generally under low pressure ranging from slightly above atmospheric to about 20 p.s.i.g. This first gas is compressed to distillation pressure or somewhat thereabove in one or, preferably, several compression stages. The final pressure of the gas will, of course, depend upon the gas composition and desired cut-point among other factors. For the gas compositions to which this invention is applicable the pressure will lie in the range from 50 p.s.i.g. to 550 p.s.i.g., and more particularly in the range of 150 p.s.i.g. to 300 p.si.g. For example, the depropanizer column should operate at a pressure from 200 p.s.i.g. to 300 p.s.i.g. utilizing a maximum reboiler temperature of 250° F. and a minimum overhead temperature of 0° F. Distinctly preferred operating conditions for the depropanizer include a pressure from 230 p.s.i.g. to 270 p.s.i.g., a bottom temperature from 200° F. to 230° F. and a top temperature from 0° F. to 20° F. The overhead from the depropanizer column operating under these conditions will produce a net overhead product which will be rich in $C_2$ to $C_3$ olefins and paraffins together with fairly substantial amounts of methane, hydrogen, and small quantities of light non-hydrocarbon gases, and the bottoms product will be rich in $C_4$ to $C_5$ olefin hydrocarbons and paraffins. In accordance with the practice of this invention this bottoms product will also contain butadiene, and the $C_3H_4$ hydrocarbon contaminants such as methyl-acetylene and propadiene.

The depropanizer bottom stream is now subjected to additional distillation conditions in a distillation column operating under a temperature from 175° F. to 300° F. and a pressure from 65 p.s.i.g. to 150 p.s.i.g. Under these operating conditions the $C_5+$ hydrocarbon materials are removed as a bottoms product. The debutanizer overhead product now contains primarily $C_4$ hydrocarbons plus small amounts of butadiene and $C_3H_4$ hydrocarbons. It is to be noted however that the $C_3H_4$ hydrocarbons are also in the presence of significant quantities of $C_3$ paraffin hydrocarbons which were left in the depropanizer bottoms product due to inefficient separations achievable in the depropanizer column. For the practice of the present invention it is distinctly preferred that the debutanizer column be operated under a pressure of from 70 p.s.i.g. to 80 p.s.i.g. and a temperature from 180° F. to 220° F. in the bottom, and 90° F. to 120° F. in the top. These operating conditions are further chosen so that less than 0.7 mol percent, preferably, less than 0.5 mol percent of the $C_5$ hydrocarbons pass into the overhead product.

The overhead product from the debutanizer column now passes into a final distillation column operating under conditions such that the $C_3$ hydrocarbons including $C_3H_4$ hydrocarbons are removed overhead as a distillate product and the butadiene and $C_4$ olefin hydrocarbons are removed as a bottoms product. The operating conditions in this final column, commonly called a BB column, include a maximum reboiler temperature of 225° F. and a pressure from 25 p.s.i.g. to 200 p.s.i.g. less than the pressure utilized in the depropanizer column discussed hereinabove. Typically the BB column operates at a pressure from 100 p.s.i.g. to 150 p.s.i.g., a temperature in the bottom of from 125° F to 200° F. and a temperature in the top from 50° F to 100° F. When operating the BB column in accordance with the teachings of the present invention the butadiene which is removed as a bottoms product therefrom will have associated therewith a contaminant or $C_3H_4$ hydrocarbon content of less than 500 p.p.m. and typically less than 100 p.p.m.

In a preferred embodiment of this invention the overhead product from the BB column containing the $C_3H_4$ hydrocarbons and other $C_3$ hydrocarbons are recycled to the feed of the depropanizer wherein such $C_3$ hydrocarbons are ultimately recovered as the overhead product from the depropanizer column. Utilizing the recycle concept of the present invention the depropanizer column discussed in detail hereinabove will now preferably operate on a combined feed ratio of from 1.1 to 1.6.

One of the advantages achieved by the practices of the present invention is the removal of the $C_3H_4$ hydrocarbons by solely distillation means rather than by hydrogenation such as generally has been practiced by those skilled in the art. If these $C_3H_4$ hydrocarbons are not removed they have a tendency to react with the solvent, such as acetonitrile, which is ultimately used to extract the butadiene and they have a tendency to produce undesired products during the polymerization of butadiene to rubber. In addition the removal of the $C_3H_4$ hydrocarbons from butadiene in the absence of the significantly large quantities of $C_3$ hydrocarbons will require an extremely elaborate additional fractionation column. Thus, significant economy and efficiency of operation has been achieved by the practice of this invention over the prior art schemes.

The invention may be more fully understood with reference to the appended drawing which is a simplified flow chart illustrating one embodiment of the present invention. For the purpose of demonstrating a specific embodiment of the invention the drawing will be described in connection with the treatment of pyrolysis gas from a commercially scaled hydrocarbon cracking plant comprising two parallel thermal cracking zones, the charge to which is respectively ethane and naphtha (55° API, boiling range 244° F. to 385° F. and an average molecular weight of 125). It will be understood that charge stocks, stream compositions, operation conditions, order of fractionation, and the like, are exemplary only and may be varied widely without departing from the spirit of the invention the scope of which is to be limited only in conformance with the claims of this application.

Pyrolysis gas containing at least 1 mol percent $C_3H_4$ and preferably from 3 to 5 mol percent is withdrawn from the prefractionator receiver at a pressure of 6 p.s.i.g. and 100° F. (not shown). This gas is then compressed to a pressure of about 250 pounds by means not shown. The compressed gas is now processed in accordance with the present invention. The gas is passed via line 10 in admixture with a $C_3$ hydrocarbon recycle stream more fully discussed hereinbelow, returning to the system via line 19. The combined streams in a combined feed ratio from 1.1 to 1.6 is passed into depropanizer column 11 at a pressure of about 250 p.s.i.g., which is maintained with a reboiler temperature of about 225° F., and an overhead temperature of about +15° F. The overhead stream comprising $C_3-$ materials including some $C_3H_4$ hydrocarbons such as methyl-acetylene in addition to non-hydrocarbon components such as $H_2S$, CO, and $CO_2$ are removed from the system via line 12 for further process and/or separation into desirable components. The bottoms from depropanizer 11 are removed via line 13 and passed into debutanizer column 14. Debutanizer 14 is maintained under distillation conditions such as 77 p.s.i.g., 200° F. in the bottom, and 115° F. in the top such that approximately 0.5% $C_5$'s and less go into the overhead system. The $C_5+$ to 400° F. material remaining in the feed to the system is removed from debutanizer column 14 via line 15 for further use and/or recycling to the pyrolysis reaction zone. The overhead product containing substantial quanities of $C_3$ paraffin hydrocarbons, $C_3H_4$ hydrocarbons, butadiene, and other $C_4$ olefin hydrocarbons, are passed into fractionating column 17 which is commonly known as a BB column. In other aspects, column 17 could be called a secondary depropanizer column. Typical operating conditions in column 17 include a pressure of about 100 p.s.i.g., a bottom temperature of about 150° F., and a top temperature of about 70° F. The pressure conditions are preferably chosen such that the pressure in column 17 is from 25 to 200 pounds less than the pressure maintained in column 11. The overhead stream from column 17 is removed via line 19 and comprises $C_3H_4$ hydrocarbons in admixture with other $C_3$ hydrocarbons. The bottoms product is removed via line 18 and contains less than 500 parts per million of $C_3H_4$ hydrocarbons and typically contains about 100 parts per million $C_3H_4$ hydrocarbons in conjunction with butadiene and other $C_4$ olefin hydrocarbons. The material in line 18 is subsequently processed in an extractive distillation zone such as one utilizing acetonitrile or other known solvents as the solvent. The butadiene is recovered from the solvent rich bottoms of the extractive distillation step in high concentration and is at that point of sufficient purity for direct use in other chemical processing reactions such as polymerization to rubber like products.

It is to be noted that with the removal of the $C_3H_4$ hydrocarbons the butadiene may be extracted in a single solvent extraction step without any additional expensive fractionation equipment for the butadiene and without obviously expensive hydrogenation equipment to remove these acetylenic compounds. As used herein, the term "solvent extraction" is used broadly to embody extractive distillation, liquid-liquid extraction, etc.

The material in line 19 is preferably recycled to the depropanizer column where ultimately the $C_3H_4$ hydrocarbons pass out of the system via line 12.

Results from a commercial scale operation can be illustrated in the following table which presents a material balance utilizing component analysis with mols per hour being used to depict the various streams. The numbers in parentheses refer to the line on the appended drawing.

The invention claimed:

1. The method for separating butadiene substantially free of $C_3H_4$ hydrocarbons from hydrocarbon pyrolysis gases comprising a major proportion of $C_1$–$C_5$ hydrocarbons including butadiene and $C_3H_4$ hydrocarbons and a minor proportion of $C_5$ to 400° F. hydrocarbons which comprises:

(a) introducing said pyrolysis gases into a first separation zone under conditions sufficient to produce a first fraction comprising $C_1$–$C_3$ hydrocarbons including $C_3H_4$ hydrocarbons and a second fraction comprising $C_3+$ hydrocarbons contaminated with $C_3H_4$ hydrocarbons;

(b) passing said second fraction into a second separation zone under conditions sufficient to produce a third fraction comprising $C_3$ and $C_4$ hydrocarbons including butadiene and said contaminant, and a fourth fraction comprising $C_5+$ hydrocarbons; and (c) passing said third fraction into a third separation zone under distillation conditions including a temperature of less than 225° F. and a pressure from 25 to 200 p.s.i.g. less than the pressure in said first separation zone sufficient to produce a $C_3$ fraction containing said contaminant and a $C_4$ fraction containing butadiene substantially free of contaminant.

2. Method according to claim 1 wherein said $C_3$ fraction of step (c) is returned to the first separation zone of step (a).

3. Method according to claim 2 wherein said $C_4$ fraction of step (c) contains less than 500 p.p.m. of $C_3H_4$ hydrocarbon.

4. Method according to claim 1 wherein said first separation zone conditions include a pressure from 200 p.s.i.g. to 300 p.s.i.g.

5. Method according to claim 1 wherein said third separation zone conditions include a temperature from 125° F. to 200° F. in the bottom, from 50° F. to 100° F. in the top, and a pressure from 80 p.s.i.g. to 200 p.s.i.g.

6. Method according to claim 3 wherein said $C_4$ fraction of step (c) is passed into solvent extraction means under conditions sufficient to produce a phase comprising solvent having butadiene dissolved therein and recovering butadiene in high concentration therefrom.

| Line No. | Process gas (10) | Recycle gas (19) | Depropanizer (11) | | | Debutanizer (14) | | BB column (17) | |
|---|---|---|---|---|---|---|---|---|---|
| | | | Feed (12) | OHD (13) | BTMS | OHD (16) | BTMS (15) | OHD (19) | BTMS (18) |
| Component: | | | | | | | | | |
| $H_2$ | 585.0 | | 585.0 | 585.0 | | | | | |
| $CH_4$ | 1,080.0 | | 1,080.0 | 1,080.0 | | | | | |
| $C_2H_2$ | 10.0 | | 10.0 | 10.0 | | | | | |
| $C_2H_4$ | 1,140.0 | | 1,140.0 | 1,140.0 | | | | | |
| $C_2H_6$ | 270.0 | | 270.0 | 270.0 | | | | | |
| $C_3H_4$ | 14.0 | 3.0 | 17.0 | 14.0 | 3.0 | 3.0 | | 3.0 | |
| $C_3H_6$ | 465.0 | 65.0 | 530.0 | 465.0 | 65.0 | 65.0 | | 65.0 | |
| $C_3H_8$ | 30.0 | 10.0 | 40.0 | 30.0 | 10.0 | 10.0 | | 10.0 | |
| $iC_4H_{10}$ | 4.0 | | 4.0 | 0.1 | 3.9 | 3.9 | | | 3.9 |
| $iC_4H_8$ | 79.7 | 0.3 | 80.0 | 0.3 | 79.7 | 79.7 | | 0.3 | 79.4 |
| $1C_4H_8$ | 59.8 | 0.2 | 60.0 | 0.3 | 59.7 | 59.7 | | 0.2 | 59.5 |
| 1-3 $C_4H_6$ | 99.8 | 0.2 | 100.0 | 0.5 | 99.5 | 99.5 | | 0.2 | 99.3 |
| $nC_4H_{10}$ | 6.0 | | 6.0 | | 6.0 | 6.0 | | | 6.0 |
| $2C_4H_6$ | 15.0 | | 15.0 | | 15.0 | 15.0 | | | 15.0 |
| $C_5$ | 85.0 | | 85.0 | | 85.0 | | 85.0 | | |
| $C_6+$ | 5.0 | | 5.0 | | 5.0 | | 5.0 | | |
| Lb. mol/hr | 3,948.3 | 78.7 | 4,027.0 | 3,595.2 | 431.8 | 341.8 | 90.0 | 78.7 | 263.1 |

It can be seen that the bottoms product from the BB column is free of $C_3H_4$ hydrocarbons, therefore, this stream may be satisfactorily subjected to extractive distillation for the recovery of high purity butadiene thereby obviating the necessity for additional fractionation equipment or hydrogenation equipment.

References Cited

UNITED STATES PATENTS 2,886,611  5/1959  King et al. _____ 203—82 X
2,901,406  8/1959  Kirshenbaum et al. ___ 202—41

DELBERT E. GANTZ, *Primary Examiner.*

G. E. SCHMITKONS, *Assistant Examiner.*

U.S. Cl. X.R.

203—82